United States Patent Office 3,275,380
Patented Sept. 27, 1966

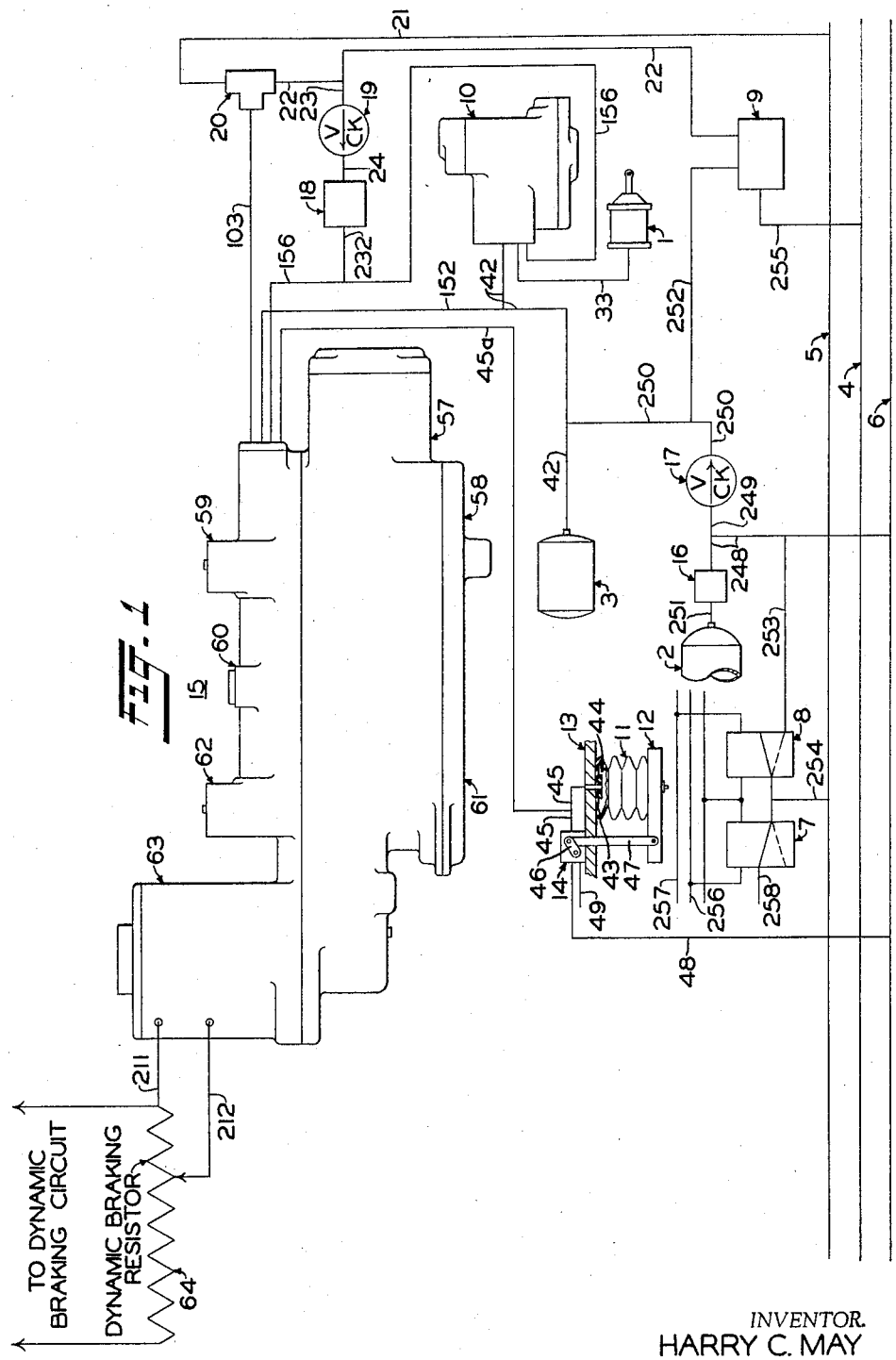

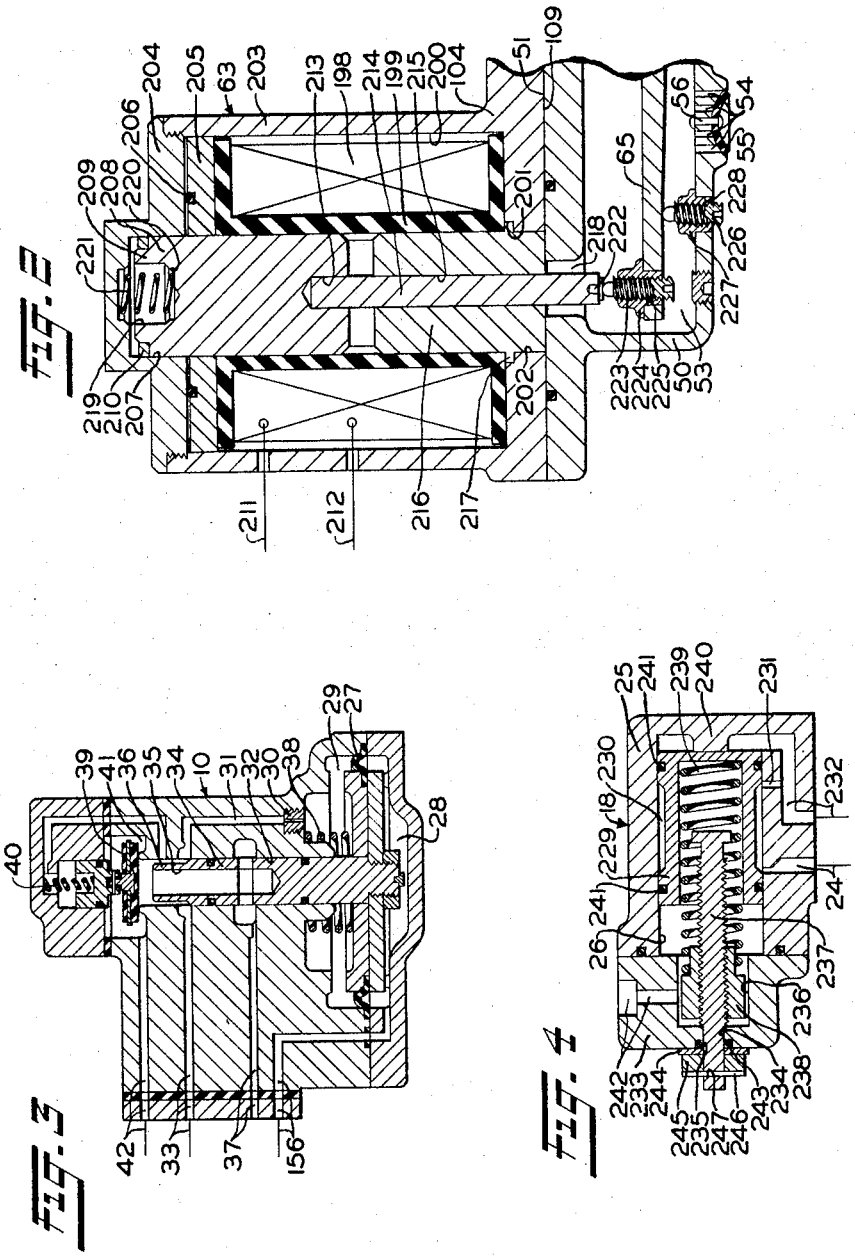

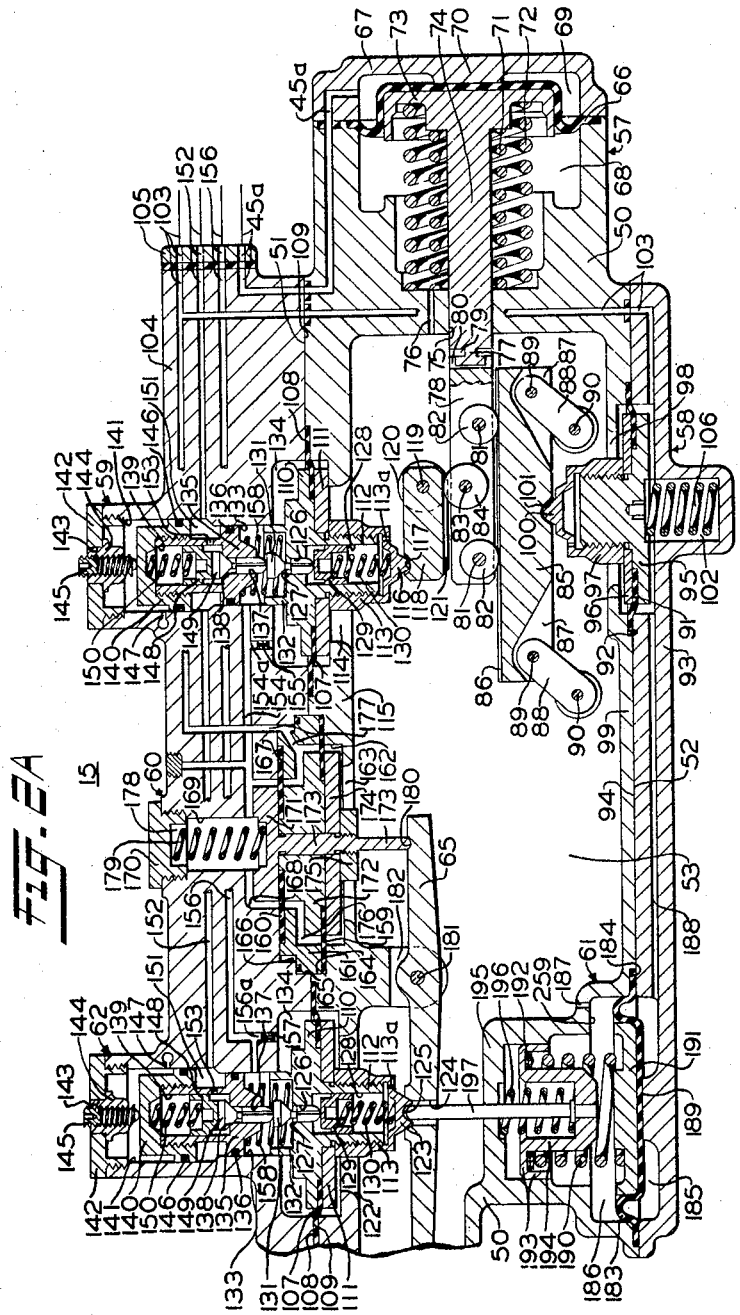

3,275,380
COMBINED DYNAMIC AND FLUID PRESSURE BRAKE SYSTEM FOR RAILWAY VEHICLES
Harry C. May, East McKeesport, Pa., assignor to Westinghouse Air Brake Company, Wilmerding, Pa., a corporation of Pennsylvania
Filed Oct. 23, 1965, Ser. No. 503,112
19 Claims. (Cl. 303—3)

This invention relates to variable load electro-pneumatic and dynamic brake apparatus for railway vehicles, such as diesel electric or electric-motor propelled rapid transit vehicles, and more particularly to such apparatus wherein the frame or body of the vehicle is supported on air springs, the pressure in which is varied to maintain the body at a substantially constant height above the rail irrespective of the load on the body.

Since, with rapid transit vehicles of the above type, the body of the vehicle is maintained at a constant height above the rails, it is apparent that it is impractical to use conventional variable load brake control arrangements, which are conditioned according to the load on the body as determined by the degree of deflection or compression of the steel truck springs on which the body of the vehicle is supported.

Furthermore, the well-known use of the driving motors of the vehicle and the control mechanism for connecting these motors in a dynamic braking circuit is efficient and economical, but it is limited in operation to a speed range above a certain low speed of the vehicle. Accordingly, because the effectiveness of the dynamic brake diminishes as the speed of the vehicle diminishes, it is necessary to provide a supplemental braking means, such as, for example a fluid pressure brake, to assist the retardation effect of the dynamic brake and subsequent to the fading out of the dynamic brake at, for example, a speed of ten miles per hour, to bring the rapid transit vehicle and a train of one or more cars that may be hauled thereby to a proper stop.

Brake control apparatus heretofore used to effect an application of a supplemental braking means as the dynamic brake fades out has often resulted in undesirably heavy applications of the supplemental braking means thereby producing severe shocks which in the case of passenger trains result in discomfort to the passengers and possibly bodily injury.

Accordingly, it is the general purpose of this invention to provide a novel variable load electro-pneumatic and dynamic brake apparatus for use on air-spring-supported rapid transit vehicles. This variable load electro-pneumatic and dynamic brake apparatus includes an improved and novel dynamic-pneumatic interlock or blending means operative while the dynamic brake is fully effective to prevent or hold off an application of the pneumatic brake, and operative as the dynamic brake fades to control the blending therewith of the pneumatic brake in such a manner as to bring the vehicle and a train that may be hauled thereby to a proper stop at a predetermined rate of deceleration. The improved and novel dynamic-pneumatic interlock or blending means further comprises a mechanism for insuring that the braking effect of the pneumatic brake is proportional to or in accordance with the load supported by the air springs and is increased proportionally as the braking effect of the dynamic brake decreases.

More particularly, according to the present invention, the novel blending means includes a first load adjusted self-lapping valve mechanism for supplying fluid under pressure to a differential abutment means that jointly with a dynamic brake controlled solenoid controls the operation of a second self-lapping valve mechanism for supplying fluid under pressure to a braking means, such as, for example, a brake cylinder device. Fluid under pressure supplied to the straight air pipe, conventionally or in any suitable manner, effects operation of the load adjusted self-lapping valve mechanism and is effective on the differential abutment means in addition to the fluid under pressure supplied thereto by the load adjusted self-lapping valve mechanism to cause the differential abutment means to operate in accordance with the net effect of the two fluid pressure forces acting thereon, to exert a force on the second self-lapping valve mechanism in opposition to the force exerted by the solenoid. Accordingly, the second self-lapping valve means is operative in response to the force exerted by the differential abutment means exceeding the force exerted by the solenoid. The second self-lapping valve mechanism is also operative, independently of the abutment means and solenoid, by a second abutment means subject to fluid under pressure supplied to the straight air pipe to provide an initial "inshot" of braking pressure to the brake cylinder device.

In the accompanying drawings:

FIG. 1 is a piping diagram showing a novel variable load combined electro-pneumatic and dynamic brake apparatus, each of several component valve devices thereof being shown in outline.

FIG. 2 and FIG. 2A, when taken together such that the right-hand edge of FIG. 2 is matched with the left-hand edge of FIG. 2A, constitutes a diagrammatic view of a dynamic-pneumatic interlock or blending valve device forming part of the invention.

FIG. 3 is a diagrammatic cross-sectional view of a fluid pressure operated relay valve device shown in outline in FIG. 1.

FIG. 4 is a diagrammatic cross-sectional view of a by-pass valve device shown in outline in FIG. 1.

*Description*

Referring to FIG. 1 of the drawings, the variable load combined electro-pneumatic and dynamic brake apparatus for use on diesel electric or electric-motor propelled rapid transit vehicles comprises a brake cylinder device 1, a main reservoir 2, a supply reservoir 3, a brake pipe 4, a straight air pipe 5, a feed valve or fluid pressure supply pipe 6, a release magnet valve device 7, an application valve device 8, an emergency valve device 9, a fluid pressure operated self-lapping relay valve device 10, an air spring device 11 interposed between a truck frame 12 and a body 13 of the vehicle for supporting the body of the vehicle, a leveling valve device 14 for maintaining a proper pressure within the air spring device 11 whereby the vehicle body 13 is maintained at a constant height above a railway roadbed irrespective of the load on the body 13, and a dynamic-pneumatic or blending valve device 15.

Additional components of the variable load combined electro-pneumatic and dynamic brake apparatus mentioned above include a feed valve device 16 for supplying fluid from the main reservoir 2 to the feed valve or supply pipe 6, the supply reservoir 3, the application magnet valve device 8, and the emergency valve device 9 at a reduced pressure, a one-way check valve device 17 for preventing back flow of fluid under pressure from the supply reservoir 3, a by-pass valve device 18 for providing a brake application of a chosen degree in response to operation of the emergency valve device 9 independently of operation of the dynamic-pneumatic interlock or blending valve device 15 which is operative to provide a brake application of a higher degree irrespective of the operation of the emergency valve device 9, a one-way check valve device 19 for preventing fluid under pressure supplied for effecting a brake application in response to operation of the dynamic-pneumatic interlock or blending valve device 15 from flowing to the emergency valve device 9, and a double check valve device 20 for controlling flow of fluid under pressure to the dynamic-pneumatic interlock or blending valve device 15 from either the straight air pipe 5, which is connected to one inlet port of this double check valve device 20 by a pipe 21, or the emergency valve device 9 which is connected to the opposite inlet port of the check valve device 20 by a pipe 22 that is also connected by a pipe 23 to the inlet of the one-way check valve device 19. The outlet of this check valve device 19 is connected by a pipe 24 to one end of a correspondingly numbered passageway formed in a cup-shaped body 25 (FIG. 4) of the by-pass valve device 18 the opposite end of which passageway opens at the wall surface of a bottom bore 26 in the body 25.

The fluid pressure operated relay valve device 10 is shown diagrammatically in FIG. 3 of the drawing and may be of the self-lapping type. Briefly, the fluid pressure operated relay valve device 10 comprises a diaphragm 27 subject opposingly to fluid pressures in a chamber 28 and in a chamber 29 that is open via a choke 30 and a passageway 31 that opens at the wall surface of a bore 32 in a sectionalized casing of the fluid pressure operated relay valve device 10. Also opening at the wall surface of the bore 32 and directly opposite the location at which the passageway 31 opens into this bore, is a passageway 33 which is connected by a pipe bearing the same numeral to the brake cylinder device 1 (FIG. 1). Slidably mounted in the bore 32 (FIG. 3) and coaxially connected to the chamber 29 side of the diaphragm 27 is one end of a valve stem 34 that is provided with a bottom bore 35, the upper end of which provides an exhaust valve 36. The bottom bore 35 is connected by cross bores that open at the periphery of the valve stem 34 which, while the valve stem 34 occupies the position shown in FIG. 3 of the drawings, registers with an exhaust passageway 37 that extends through the sectionalized casing to atmosphere. When fluid under pressure in chamber 28 exceeds that in chamber 29, the diaphragm 27 will shift upward, against the yielding resistance of a light bias spring 38 disposed in the chamber 29 and encircling the valve stem 34 to successively seat the exhaust valve 36 against a disc-type supply valve 39 and then operatively unseat the latter against the force of a lightly biased spring 40. The supply valve 39 is disposed in a chamber 41 which is connected by a passageway and corresponding pipe 42 to the supply reservoir 3. Therefore, fluid under pressure is supplied from the supply reservoir 3 to the chamber 41 via the pipe and passageway 42 in the relay valve device 10. With supply valve 39 unseated, fluid under pressure from the supply reservoir 3 will flow to chamber 41 through the passageway just traced, and thence from the chamber 41 via the bore 32 and the passageway and pipe 33 to the brake cylinder device 1 and also via the passage 31 and choke 30 to the chamber 29 until the pressure in the chamber 29 together with the force of the spring 38 is increased to substantially the force provided by the fluid under pressure present in the chamber 28; whereupon the diaphragm 27 will be shifted downward by the spring 38 to a lap position in which the supply valve 39 is reseated by the spring 40 and the exhaust valve 36 is maintained seated against the flat disc-type valve 39 thereby retaining in the brake cylinder device 1 a pressure substantially equal to that provided in the chamber 28. Whenever the pressure in chamber 28 is reduced, the diaphragm 27 will be moved downward by the spring 38 to a release position in which it is shown in FIG. 3 of the drawings and in which the exhaust valve 36 is unseated from the then seated supply valve 39 for thereby releasing fluid under pressure from the brake cylinder device 1 and the chamber 29 until the pressure in the chamber 29 is reduced to the pressure present in the chamber 28. Slight further reduction in the pressure in the chamber 29 will cause the pressure in the chamber 28 to move the diaphragm 27 and the valve stem 34 upward until the exhaust valve 36 moves into contact with the lower side of the flat disc valve 39 which constitutes a lap position for the relay valve device 10. Thus relay valve device 10 operates to provide a brake cylinder pressure which is substantially equal to the pressure of fluid supplied to the chamber 28 in a manner hereinafter described in detail.

The air spring device 11 (FIG. 1) comprises a hollow casing 43 consisting of two flat, spaced, coaxially arranged and preferably circular end walls joined to each other by a corrugated or bellows-like axially expandable portion. The air spring device 11 is so arranged that the end walls of casing 43 are in vertical spaced relation with the lower end wall resting on a flat horizontal surface of an unsprung member such as, for example, the truck frame 12, while the upper end wall abuts a flat horizontal surface on the vehicle body 13 or other sprung member. Within the casing 43 is a chamber 44 that is chargeable with fluid under pressure from the leveling valve device 14 via a pipe 45 for maintaining the vehicle body 13 at a preselected height above the rails.

The leveling valve device 14 may, for example, be of the type disclosed in Patent No. 2,945,690 issued July 19, 1960, to Harry C. May and Joseph F. Frola, and assigned to the assignee of the present invention. This valve device 14 is mounted on the vehicle body 13 or other sprung member and comprises, briefly, valve means (not shown) controlled by a lever 46 pivotally connected at one end to a rotatable cam shaft and at the opposite end to one end of a link 47 that, at its opposite end, is anchored to an unsprung member such as, for example, the truck frame 12; the valve means being operable by the link 47, lever 46, and the cam shaft to effect the supply of fluid under pressure from a branch pipe 48 that is connected to the feed valve pipe 6 to the chamber 44 of the air spring device 11 via a choke (not shown) and the pipe 45, and release fluid under pressure from the chamber 44 via pipe 45 and a vent pipe 49, as may be required to establish in the chamber 44 different fluid pressures at different times to maintain the vehicle body 13 at the aforementioned preselected height relative to the truck frame 12 and the rails of the railway roadbed. Thus, the pressure of air established in the chamber 44 is an accurate measure of the load imposed by the vehicle body 13 on the truck frame 12.

The dynamic-pneumatic interlock or blending valve device 15 shown in FIGS. 2 and 2A when the right-hand edge of FIG. 2 is matched with the left-hand edge of FIG. 2A of the drawings comprises a sectionalized casing having a main casing section 50 that is provided with a flat top surface 51 and a flat bottom surface 52 for a purpose hereinafter made apparent. Formed within the main casing section 50 is a main chamber 53 that, as shown in FIG. 2, is open to atmosphere via a plurality of aligned bores 54 in this casing section, which bores 54 are normally closed by a flexible member 55 constructed of some suitable material such as, for example, rubber. The member 55 is secured to the main casing section 50 by, such as, for example, a rivet 56 in such a manner as to normally overlie the lower ends of the bores 54 as shown in FIG. 2.

As shown in FIGS. 2 and 2A of the drawings, the dynamic-pneumatic interlock or blending valve device 15 comprises a load sensing portion 57, a variable load power unit 58, a variable load regulating valve mechanism 59, a brake demand differential-type fluid motor 60, an in-shot portion 61, a brake cylinder regulating valve mechanism 62, a dynamic brake compensating magnet 63 which, as shown in FIG. 1, is connected in circuit with a portion of a dynamic braking resistor 64 that in turn is connected in a dynamic braking circuit that includes the armatures of the traction motors of the vehicle, and a balancing beam 65 that is pivotally mounted on the main casing section 50 and operatively connected to the brake demand differential type fluid motor 60 and to the dynamic brake compensating magnet 63 in a manner hereinafter explained in detail.

As shown in FIG. 2A of the drawings, the load sensing portion 57 of the dynamic-pneumatic interlock or blending valve device 15 comprises a diaphragm 66, the outer periphery of which is clamped between the right-hand end of the main casing section 50 and a cover member 67 which is secured to the main casing section 50 by any suitable means (not shown).

The diaphragm 66 cooperates with the main casing section 50 and the cover member 67 to form within the dynamic-pneumatic interlock or blending valve device 15 and on opposite sides of the diaphragm 66, two chambers 68 and 69 into the latter of which opens a passageway 45a that is connected by a pipe bearing the corresponding numeral to the hereinbefore-mentioned pipe 45 that is connected to the chamber 44 in the air spring device 11. Consequently, the right-hand side of the diaphragm 66 is always subject to the pressure in the air spring chamber 44. The right-hand side of the center portion of the diaphragm 66 is normally biased against a stop 70 formed on the cover member 67 by two concentrically arranged springs 71 and 72 that are interposed between the main casing section 50 and a diaphragm follower 73 that abuts the left-hand side of the diaphragm 66.

Formed integral with the diaphragm follower 73 and extending from the left-hand side thereof is a stem 74 that is coaxially arranged within the springs 71 and 72. The stem 74 extends through a bore 75 formed in the main casing section 50 between the chambers 53 and 68 which chambers are also connected by a passageway 76 in the main casing section 50 whereby the chamber 68 is open to atmosphere via this passageway, the chamber 53 and the bores 54 (FIG. 2) in the main casing section 50 it being understood that the flexible member 55 flexes in the direction to allow flow of fluid under pressure from the chamber 53 to atmosphere via the bores 54 whenever the pressure in chamber 53 exceeds atmospheric pressure.

As shown in FIG. 2A, the diameter of the left-hand end portion of the stem 74 is slightly less than the diameter of the major portion of this stem. Furthermore, adjacent this left-hand end portion, the stem 74 is provided with a portion 77 the diameter of which is substantially less than that of the remainder of the stem 74 whereby this stem may be operatively connected to a substantially rectangular carriage member 78 the right-hand end of which, as shown in FIG. 2A, is provided with two vertically arranged slots 79 and 80 of unequal width for respectively receiving therein the portion 77 and the left-hand end portion of the stem 74.

The carriage member 78 is provided with two parallel spaced-apart bores into each of which is pressed a shaft 81 the length of which exceeds the width of the carriage member 78 whereby each shaft constitutes an axle upon which adjacent each end is rotatably mounted a roller 82. The carriage member 78 is further provided with a third bore the axis of which is above a line passing through the axes of the two above-mentioned bores and parallel to these axes. Press-fitted into this third bore is a shaft 83 the length of which also exceeds the width of the carriage member 78 whereby this shaft 83 constitutes an axle upon which adjacent each end is rotatably mounted a roller 84.

As shown in FIG. 2A, the variable load power unit 58 comprises a link 85 the upper side of which is provided with a groove 86. The width of this groove 86 is sufficient to receive therein each of the two rollers 82 carried on each shaft 81 adjacent each end thereof whereby the link 85 serves to support the carriage member 78.

The opposite ends of the link 85 are provided with identical but oppositely arranged recesses 87 in each of which is received one end of one of a pair of cranks 88, the one end of each crank 88 being pivotally connected to the link 86 by means of a pin 89. The opposite end of each crank 88 is pivotally mounted on a corresponding pin 90 that has its opposite ends anchored in opposite parallel spaced-apart walls that constitute a part of the main casing section 50.

The variable load power unit 58 further comprises a flat-type annular diaphragm 91 the outer periphery of which is disposed in a groove 92 formed in the flat bottom surface 52 on the main casing section 50 and clamped between this main casing section 50 and a bottom cover member 93 having a flat surface 94 that abuts the flat bottom surface 52 formed on the bottom of the main casing section 50. The bottom cover member 52 is secured to the main casing section 50 by any suitable means (not shown).

The inner periphery of the flat-type annular diaphragm 91 is clamped between a diaphragm follower 95 and an annular diaphragm follower plate 96 through which extends a screw-threaded stem integral with the diaphragm follower 95 which stem receives an inverted cup-shaped nut 97 that has screw-threaded engagement therewith. The cup-shaped nut 97 extends through an annular opening 98 formed in a lower wall 99 of the main casing section 50 into the chamber 53 within this casing section. The cup-shaped nut 97 has formed integral therewith a dome-shaped pusher element 100 that is received in a conical recess 101 having a spherical end formed in the lower side of the link 85 whereby this link is supported on the dome-shaped pusher element 100.

The flat-type annular diaphragm 91 cooperates with the bottom cover member 93 to form on the lower side of the diaphragm a chamber 102 which is connected by a passageway 103 that extends through the cover member 93, the main casing section 50, a top casing section 104 that is secured to the main casing section 50 by any suitable means (not shown), and a pipe bracket 105 secured to the top casing section 104 by any suitable means (not shown) to which pipe bracket 105 all pipe connections are made, and a pipe bearing the same numeral to the side outlet of the double check valve device 20 (FIG. 1).

In the absence of fluid under pressure in the chamber 102 the pusher element 100 is biased against the surface of the conical recess 101 in the link 85 by a spring 106 that is disposed within the chamber 102 and interposed between the diaphragm follower 95 and the cover member 93 so that the link 85 is normally maintained in the position shown in FIG. 2A.

The variable load regulating valve mechanism 59 and the brake cylinder regulating valve mechanism 62 are, with a single exception hereinafter explained, identical in construction. Therefore, a description of one will suffice for both. Accordingly, like reference numerals have been used to designate the structure of the brake cylinder regulating valve mechanism 62 which is identical with that of the variable load regulating valve mechanism 59, each being a self-lapping type of valve mechanism.

The variable load regulating valve mechanism 59 and the brake cylinder regulating valve mechanism 62 each comprise a flat-type diaphragm 107 the outer periphery of which is disposed in an annular groove 108 formed in the flat top surface 51 on the main casing section 50 and clamped between this main casing section 50 and the top casing section 104 that has a flat bottom surface 109 that abuts the flat top surface 51 formed on the top of the main casing section 50.

The inner periphery of each flat type diaphragm 107 is clamped between a combined diaphragm follower and exhaust valve seat member 110 and an annular diaphragm plate 111 through which a screw threaded stem 112 integral with the valve seat member 110 extends to receive a screw-threaded cup-shaped nut 113 which is tightened against the annular diaphragm plate 111. The cup-shaped nut 113 of the variable load regulating valve mechanism 59 is provided with a port 113a and extends through an annular opening 114 in an upper wall 115 of the main casing section 50 into the chamber 53 within this casing section and has formed integral therewith a dome-shaped pusher element 116 that is received in a conical recess 117 having a spherical end formed in the upper side of and adjacent the left-hand end of a proportioning lever 118 that is pivoted adjacent its right-hand end on a shaft 119 that has its opposite ends anchored in a pair of bosses 120, only one of which appears in FIG. 2A, formed integral with two parallel spaced-apart vertical walls of the chamber 53 and each boss extending inward from its respective wall toward the opposite wall. The lower side of the proportioning lever 118 is provided with a groove 121 the width of which is sufficient to receive therein each of the two rollers 84 carried on the shaft 83 adjacent the opposite ends of this shaft which in turn is carried by the carriage member 78 that is movable relative to the proportioning lever 118 in a manner hereinafter described.

The cup-shaped nut 113 of the brake cylinder regulating valve mechanism 62 extends through an annular opening 122 in the wall 115 of the main casing section 50 into the chamber 53 within this casing section and has formed integral therewith an inverted truncated cone-shaped pusher element 123 that is coaxial with a bore 124 formed in the hereinbefore-mentioned balancing beam 65. The pusher element 123 has formed therein a semi-circular recess 125 for a purpose hereinafter made apparent.

The above-mentioned combined diaphragm follower and exhaust valve seat member 110 of both the variable load regulating valve mechanism 59 and the brake cylinder regulating valve mechanism 62 is provided with a bore 126 having an annular exhaust valve seat 127 formed at its upper end. A counterbore 128 that is coaxial with the bore 126 extends through the stem 112 to the lower end thereof.

Slidably mounted in each of the counterbores 128 in an inverted cup-shaped plunger 129 between which and the bottom of the cup-shaped nut 113 is interposed a spring 130 that is effective to urge the plunger 129 against the bottom of the fluted stem of an exhaust valve 131 it being understood that each fluted stem is slidably mounted in the bore 126 in the corresponding combined diaphragm follower and exhaust valve seat member 110.

Each of the combined diaphragm follower and exhaust valve seat members is provided on its upper side with a cylindrical skirt portion 132 that is slidably guided in a corresponding bore 133 formed in the top casing section 104 and opening at its lower end into a chamber 134 formed by the cooperative relation of the corresponding flat-type diaphragm 107 and the top casing section 104.

Sealingly and slidably mounted in each of the bores 133 above the skirt portion 132 of the corresponding combined diaphragm follower and exhaust valve seat member 110 is a supply valve seat piston member 135 that is provided with a peripheral annular groove in which is disposed an O-ring 136 that forms a seal with the wall surface of the bore 133 to prevent flow of fluid under pressure from each side of the piston member 135 to the other. Each supply valve seat piston member 135 is provided with a bore 137 having an annular supply valve seat 138 formed at its upper end and a coaxial counterbore 139 that extends to the upper end of the piston member which upper end is provided with external screw-threads that have screw-threaded engagement with corresponding internal screw threads formed on the interior of a cup-shaped piston member 140 that is slidably mounted in a counterbore 141 that is formed in the top casing section 104 and is coaxial with the corresponding bore 133 in this casing section.

The upper end of each counterbore 141 is provided with internal screw-threads that have screw-threaded engagement with external screw threads formed on a corresponding cap nut 142 that closes the upper end of the respective counterbore 141. Each of the cap nuts 142 is provided with a bore 143 into which is press-fitted a flanged plug 144 that is provided with a screw-threaded bore for receiving a screw-threaded adjusting screw 145 the lower end of which abuts the top of the cup-shaped piston member 140 that is provided with a peripheral annular groove in which is disposed an O-ring 146 that forms a seal with the wall surface of the counterbore 141 to prevent leakage of fluid under pressure from the lower side of the cup-shaped piston member 140 to the upper side which is open to atmosphere via a passageway 147 that is formed in the top casing section 104 and at one end opens at the wall surface of the counterbore 141 above the O-ring 146 and at the opposite end (not shown) opens at the exterior surface of the top casing section 104.

Slidably mounted in the counterbore 139 formed in each supply valve seat piston member 135 is a cup-shaped piston element 148 that has formed integral therewith a supply valve 149 having a fluted stem that is disposed in the bore 137 in the corresponding supply valve seat piston member 135. Each of the supply valves 149 is biased in the direction of its corresponding supply valve seat 138 by a spring 150 that is interposed between the cup-shaped piston element 148 and the cup-shaped piston member 140 it being noted from FIG. 2A of the drawings that these two cup-shaped members are oppositely arranged.

It can be seen from FIG. 2A that each of the cup-shaped piston members 140 cooperates with the corresponding supply valve seat piston member 135 and with the wall surface of the bore 133 and the counterbore 141 to form a chamber 151 into which opens a passageway 152 that extends through the top casing section 104 and is connected by a pipe bearing the same numeral to the hereinbefore-mentioned pipe 42 (FIG. 1) that in turn is connected to the supply reservoir 3 as hereinbefore explained. Consequently, each of the chambers 151 is charged with fluid under pressure from the supply reservoir 3 to the same pressure as is present in this reservoir. Each of the chambers 151 is connected to the interior of the counterbore 139 in the corresponding supply valve seat piston member 135 by a port 153 in this piston member in order that the fluid under pressure present in the chamber 151 may flow through this port 153 to the interior of the counterbore 139 and thence past the supply valve 149 when it is unseated from the annular supply valve seat 138 in a manner hereinafter explained in detail.

As shown in FIG. 2A, opening at the wall surface of the bore 133 at a location below the supply valve seat piston member 135 of the variable load regulating valve mechanism 59 is one end of a passageway 154 that extends through the top casing section 104 to the brake demand differential type fluid motor 60 hereinafter described in detail. A branch 154a of the passageway 154 connects this passageway 154 to the chamber 134 above the flat-type diaphragm 107 via a choke 155 that is disposed in the branch 154a.

As shown in FIG. 2A, opening at the wall surface of the bore 133 at a location below the supply valve seat piston member 135 of the brake cylinder regulating valve mechanism 62 is one end of a passageway 156 that extends through the top casing section 104 and the pipe bracket 105 and is connected by a pipe bearing the same numeral to one end of a corresponding pasageway (FIG. 3) in the self-lapping relay valve device 10. The opposite end of this passageway opens into the chamber 28 below the diaphragm 27 of the relay valve device 10. As shown in FIG. 2A, a branch 156a of the passageway 156 connects this passageway 156 to the chamber 134 above the flat type diaphragm 107 of the brake cylinder regulating valve mechanism 62 via a choke 157 that is disposed in the branch 156a.

In order to normally bias each supply valve seat piston member 135 in a direction away from the corresponding combined diaphragm follower and exhaust valve seat member 110, a spring 158 is interposed between these members, this spring also being effective to maintain the corresponding supply valve seat piston member 135 in such a position that the O-rings 136 and 146 carried respectively by this piston member and the piston member 140 provide for the flow of fluid under pressure to the chamber 151 from the supply reservoir 3 via the pipe 42 and the pipe and corresponding passageway 152 and prevent flow of fluid under pressure from this chamber except when the supply valve 149 is unseated from the corresponding annular supply valve seat 138 in a manner hereinafter described in detail.

The brake demand differential-type fluid motor 60 comprises two annular flat-type diaphragms 159 and 160 of unequal area. The outer periphery of the larger diaphragm 159 is clamped between the bottom of a first counterbore 161 in the main casing section 50, which counterbore is coaxial with a second counterbore 162 and an opening 163 in this casing section, and an annular member 164 that is received in the counterbore 161. The annular member 164 is interposed between the upper side of the diaphragm 159 and the top casing section 104 which is provided with a first counterbore 165 that has the same diameter as the counterbore 161 and is coaxial therewith whereby the outer peripheral surface of the annular member 164 lies partly in the counterbore 161 and partly in the counterbore 165 so that the annular member 164 serves to clamp the outer periphery of the annular diaphragm 159 against the main casing section 50 when these two casing sections are secured together.

As shown in FIG. 2A, the annular member 164 constitutes two integral cylinders of unequal diameter the smaller of which is disposed in a coaxial counterbore 166 formed in the top casing section 104, the diameter of this counterbore 166 being less than that of the counterbore 165 which is coaxial therewith.

As is shown in FIG. 2A, the upper end of the annular member 164 is provided with an annular groove 167 in which is disposed the outer periphery of the smaller annular diaphragm 160 whereby the outer periphery of this diaphragm is clamped between the annular member 164 and the top casing section 104 when this casing section is secured to the main casing section 50.

Formed in the top casing section 104 is a counterbore 168 and a coaxial bore 169 the upper end of which is provided with internal screw threads that engage corresponding external screw threads formed on a cap nut 170 that closes the upper end of the bore 169 which is coaxial with the hereinbefore-mentioned counterbores 165 and 166 in the top casing section 104.

The inner periphery of the smaller annular diaphragm 160 is clamped between a diaphragm follower 171 that is disposed within the counterbore 168 and an annular member 172 that is interposed between the adjacent sides of the annular diaphragms 159 and 160 and is provided with a bore through which extends a stem 173 that is integral with the diaphragm follower 171. The stem 173 also extends through a bore in a diaphragm follower plate 174 and is provided with screw threads for receiving a screw-threaded nut 175 which is effective to cause the inner periphery of the smaller annular diaphragm 160 to be clamped between the diaphragm follower 171 and the annular member 172, and the inner periphery of the larger annular diaphragm 159 to be clamped between the annular member 172 and the diaphragm follower plate 174.

The adjacent sides of the annular diaphragms 159 and 160 cooperate with the inner annular member 172 and the outer annular member 164 to form a chamber 176 into which opens one end of a passageway 177 that extends through the outer annular member 164 and the top casing section 104 and is connected at its opposite end to the hereinbefore-mentioned passageway 103 in the top casing section 104.

The upper side of the smaller annular diaphragm 160 cooperates with the wall surface of the counterbore 168 and bore 169 and the cap nut 170 to form a second chamber 178 into which opens the other end of the hereinbefore-mentioned passageway 154.

Disposed within the chamber 178 and interposed between the cap nut 170 and the diaphragm follower 171 is a spring 179 which is effective to bias the diaphragm follower 171 and the stem 173 that is integral therewith in a downward direction so that the lower end of the stem 173 is received in a semicircular recess 180 that is formed in the right-hand end of the balancing lever 65, which is pivotally mounted intermediate its ends on a pin 181 the opposite ends of which are anchored in the jaws of a clevis 182 that is formed integral with the upper wall 115 of the main casing section 50. The spring 179 is thus effective to normally bias the balancing lever 65 in a clockwise direction about the pin 181 into contact with the hereinbefore-mentioned inverted truncated cone-shaped pusher element 123 that is integral with the cup-shaped nut 113 of the brake cylinder regulating valve mechanism 62.

The inshot portion 61 of the blending valve device 15 comprises a diaphragm 183 the outer periphery of which is disposed in an annular groove 184 formed in the flat bottom face 52 of the main casing section 50 and clamped between this casing section and the bottom cover member 93 as shown in FIG. 2A of the drawings.

The diaphragm 183 cooperates with the main casing section 50 and the bottom cover member 93 to form within the inshot portion 61 and on opposite sides of diaphragm, two chambers 185 and 186 the latter being open to the atmospheric chamber 53 via a short passageway 187 in the main casing section 50. Consequently, the pressure in the chamber 186 is always atmospheric. The chamber 185 is connected to the hereinbefore-mentioned chamber 102 in the variable load power unit 58 via a passageway 188 formed in the bottom cover member 93. The lower side of the center portion of the diaphragm 183 is normally biased against a stop 189 formed integral with the bottom cover member 93 by a first spring 190 that is interposed between a diaphragm follower 191 that abuts the upper side of the diaphragm 183 and a plurality of shims 192 which rest against an out-turned skirted flange 193 formed at the upper end of a cup-shaped spring seat 194. Interposed between the cup-shaped spring seat 194 and a wall 195 that is integral with the main casing section 50 is a second spring 196 that is disposed in surrounding relation to a stem 197 the lower end of which is press-fitted into a bore formed in the bottom of the cup-shaped spring seat 194. The stem 197 extends through a bore in the wall 195 and the hereinbefore-mentioned bore 124 in the balancing beam 65 and has its upper end disposed in the hereinbefore-mentioned semi-circular recess 125 in the inverted truncated cone-shaped pusher element 123, this stem thus serving as a medium through which the brake cylinder regulating valve mechanism 62 may be independently operated by the inshot portion 61 to effect the supply of fluid under pressure to a chosen degree to the self-lapping relay valve device 10 which in turn is operated thereby to effect the supply of fluid under pressure to the brake cylinder device 1 until the same degree of pressure of fluid is present in the brake cylinder device 1.

The dynamic brake compensating magnet 63 shown in FIGS. 1 and 2 comprises a magnet coil 198 (FIG. 2) that is wound on a spool 199 having a flange at each end and constructed of some suitable insulating material. The spool 199 is disposed within a counterbore 200 that is coaxial with a second counterbore 201 and a bore 202 formed in a cylindrical boss 203 that is integral with the left-hand end of the top casing section 104. The upper end of the counterbore 200 is provided with internal screw-threads which have screw-threaded engagement with corresponding external screw threads formed on a cap nut 204 between which and the top of the flanged spool 199 is disposed an annular member 205. The upper side of the annular member 205 is provided with an annular groove in which is disposed an O-ring 206 that forms a seal with the bottom of the cap nut 204.

Disposed within the spool 199 and extending through the annular member 205 and into a counterbore 207 formed in the cap nut 204 is a plunger 208 that is provided at its upper end with a portion 209 of reduced diameter on which is press-fitted a guide ring 210. The guide ring 210 is constructed of some material having good wearing characteristics such as, for example, brass and has a diameter slightly greater than the diameter of the plunger 208. Consequently, the guide ring 210 so positions the plunger 208 that its peripheral surface is out of contact with the wall surface of the counterbore 207 thereby preventing wear of the plunger 208 as it reciprocates in response to energization and de-energization of the magnet coil 198, the respective terminals of which are, as shown in FIG. 1, connected by wires 211 and 212 to a portion of the hereinbefore-mentioned dynamic braking resistor 64.

As shown in FIG. 2 of the drawings, the lower end of the plunger 208 is provided with a bottom bore 213 into which is press-fitted an actuating rod 214. The actuating rod 214 extends through a bore 215 in a core member 216 that is partly disposed within the lower portion of the spool 199 and partly within the bore 202 in the cylindrical boss 203, the core member 216 being provided near its lower end with a collar 217 that is disposed in the counterbore 201. The lower end of the core member 216 rests on the flat top surface 51 of the main casing section 50 that is provided with an opening 218 through which the lower end of the actuating rod 214 extends into the chamber 53.

The upper end of the plunger 208 is provided with a counterbore 219 and a coaxial bottom bore 220 for receiving one end of a spring 221 that is interposed between the cap nut 204 and the plunger 208 for biasing the plunger 208 and the actuating rod 214 in a downward direction. The lower end of the actuating rod 214 is provided with a wear pin 222 the head of which abuts the upper end of an adjusting screw 223 that has screw-threaded engagement with corresponding internal screw threads formed in a flanged plug 224 that is press-fitted into a bore 225 formed in the balancing beam 65 adjacent the left-hand end thereof, as shown in FIG. 2. Therefore, while the magnet coil 198 is deenergized and no fluid under pressure is present in the chambers 176 and 178 in the brake demand differential type fluid motor 60, the spring 221, which is stronger than the spring 179, is effective via plunger 208, actuating rod 214, adjusting screw 223, and flanged plug 224, to bias the balancing beam 65 in a counterclockwise direction about the pin 181 (FIG. 2A) and against the upper end of an adjusting screw 226 (FIG. 2) that has screw-threaded engagement with corresponding internal screw threads formed in a flanged plug 227 that is press-fitted into a bore 228 formed in the main casing section 50.

The feed valve device 16 shown in FIG. 1 of the drawings may be substantially the same as that shown and described in Descriptive Catalog No. 2060 issued June 1953 by Westinghouse Air Brake Company, Air Brake Division, Wilmerding, Pennsylvania.

The by-pass device 18 shown in FIGS. 1 and 4 comprises, in addition to the hereinbefore-mentioned cup-shaped body 25 shown in FIG. 4, a cup-shaped piston 229 that is slidably mounted in the bottom bore 26 and is provided with an elongated peripheral annular groove 230 which, while the piston 229 occupies the position shown in FIG. 4, establishes a communication between the passageway and corresponding pipe 24, which is connected to the outlet of the one-way check valve device 19 (FIG. 1), and a passageway 231 (FIG. 4) one end of which opens at the wall surface of the bottom bore 26 and the opposite end of which opens into a passageway 232 intermediate the ends thereof, which passageway 232 is formed in the cup-shaped body 25. One end of the passageway 232 opens into the bottom bore 26 at the right-hand end thereof and the opposite end of the passageway 232 is connected by a pipe bearing the same numeral to the hereinbefore-mentioned pipe 156 as shown in FIG. 1.

As shown in FIG. 4, the open end of the bottom bore 26 in the cup-shaped body 25 is closed by a cover member 233 that is secured to the body 25 by any suitable means (not shown). The cover member 233 is provided with a bore 234 and two coaxial counterbores 235 and 236 extending inward from the respective opposite sides of the cover member 233. Extending through the bore 234 is an unthreaded portion of a threaded stem 237 the threaded portion of which is larger in diameter and carries thereon in screw-threaded engagement therewith a spring seat 238, between which and the bottom of the cup-shaped piston 229 is interposed a spring 239 that is effective to normally bias the cup-shaped piston 229 to the position shown in FIG. 4 in which its right-hand end abuts a stop 240 formed integral with the cup-shaped body 25. The cup-shaped piston 229 is provided adjacent each of its ends with a peripheral annular groove in each of which is disposed an O-ring 241 that forms a seal with the wall surface of the bottom bore 26. While the cup-shaped piston 229 occupies the position in which it is shown in FIG. 4, the left-hand O-ring 241 prevents leakage of fluid under pressure from the elongated peripheral annular groove 230 to atmosphere via the bottom bore 26 in the cup-shaped body 25, the counterbore 236 in the cover member 233 and a passageway 242 in this cover member which passageway at one end opens at the wall surface of the counterbore 236 and at the other end at the exterior surface of the cover member 233. Whenever the pressure in the passageway 232 and effective on the right-hand end of the cup-shaped piston 229 is increased sufficiently to overcome the initial resistance of the spring 239 the cup-shaped piston 229 will be moved against the yielding resistance of this spring 239 as the pressure increases to a position in which the O-ring 241 adjacent the right-hand end of the piston 229 is disposed at the left-hand side of the opening of the passageway 231 at the wall surface of the bottom bore 26. In this position communication between the passageways 24 and 231 is closed, thereby preventing flow from the pipe 24 to the pipe 232 and to the right-hand end of the cup-shaped piston 229. Consequently, the by-pass valve device 18 serves to limit to a selected amount the pressure that may be supplied to the chamber 28 (FIG. 3) of the relay valve device 10 in response to operation of the emergency valve device 9 as a result of a reduction of the pressure in the brake pipe 4 at an emergency rate.

An O-ring 243 is disposed in the counterbore 235 and is retained in place by two abutting washers 244 and 245 and a pin 246 that is driven into a bore 247 adjacent the left-hand end of the stem 237.

Operation

Assume initially that the variable load electro-pneumatic and dynamic brake apparatus shown in FIG. 1 is void of fluid under pressure; and that the feed valve device 16 has been adjusted to provide via a pipe 248 a desired (such as seventy pounds per square inch) normal charged pressure in the feed valve or supply pipe 6, and in the supply reservoir 3, the pipe 248 being connected via a pipe 249 to the inlet of the one-way check valve device 17, the outlet of which is connected by a pipe 250 to the hereinbefore-mentioned pipe 42 which is connected to the supply reservoir 3. Under these conditions the various components of the apparatus, with the exception of the vehicle body 13 and the leveling valve device 14, will be in the respective positions in which they are shown in FIGS. 1, 2, 2A, 3 and 4. In the absence of fluid under pressure in the chamber 44 of the air spring device 11, it will be understood that the vehicle body 13 occupies a position below that shown in FIG. 1, or nearer the rails of the railway roadbed, and is supported either on steel springs or car bumpers (not shown).

*Initial charging*

To initially charge the apparatus, the diesel engines are started for operating fluid compressors (not shown) to effect charging of the main reservoir 2. Fluid under pressure will now charge the variable load electro-pneumatic and dynamic brake apparatus in the following manner:

Fluid under pressure will be supplied from the main reservoir 2 to the feed valve device 16 via a pipe 251. The feed valve device 16, which has been adjusted to supply fluid under pressure at a desired value, which, as hereinbefore stated, may be, for example, seventy pounds per square inch, supplies fluid at this pressure to the pipe 248 from which it flows to the feed valve or supply pipe 6 to charge this supply pipe to the pressure for which the feed valve device 6 has been adjusted.

As fluid under pressure is supplied to the pipe 248, in the manner just explained, to increase the pressure therein from atmospheric pressure to a preselected normal value, which, for example, may be seventy pounds per square inch, as stated above, the supply reservoir 3, which is connected to the delivery of the feed valve device 16 via the pipes 42 and 250, one-way check valve 17, pipe 249 and pipe 248, is simultaneously supplied with fluid under pressure so that the pressure in the supply reservoir 3 increases at the same rate as the pressure in the feed valve pipe 6.

The fluid under pressure supplied to the pipe 250 also flows to the emergency valve device 9 via a pipe 252, and the fluid under pressure supplied to the pipe 42 flows to the chamber 41 in the relay valve device 10 and also to the chamber 151 in the variable load regulating valve mechanism 59 and to the chamber 151 in the brake cylinder regulating valve mechanism 62 via the pipe and corresponding passageway 152.

Since the feed valve pipe 6 is connected to the leveling valve device 14 via the pipe 48, as the pressure in the feed valve pipe 6 and pipe 48 increases in response to the supply of fluid under pressure thereto by the feed valve device 16, the leveling valve device 14 operates to provide in pipe 45 and hence in the chamber 44 of the air spring device 11, fluid at a pressure sufficient to raise or lift the vehicle body 13 upward from the steel springs or car bumpers to the aforementioned preselected height above the railway roadbed or, in other words, to the position shown in FIG. 1.

The fluid under pressure provided in the pipe 45 by the leveling valve device 14 flows therefrom to the chamber 69 (FIG. 2A) in the load sensing portion 57 of the dynamic-pneumatic interlock or blending valve device 15 via the pipe and corresponding passageway 45a so that the pressure in the chamber 69 and in the chamber 44 in the air spring device 11 (FIG. 1) are always the same and this pressure is an indication of the load on the vehicle body 13.

The fluid under pressure supplied by the feed valve device 16 to the pipe 248 also flows to the application magnet valve device 8 via a pipe 253. Since the application magnet valve device 8 is deenergized, its valve (not shown) is closed to prevent flow of fluid under pressure from the pipe 253 to the straight air pipe 5 via a pipe 254.

The brake pipe 4 may be charged to a pressure corresponding to a preselected normal charged value in a conventional manner. The brake pipe 4 is connected to the emergency valve device 9 by a pipe 255.

The straight air pipe 5 is open to atmosphere via the energized release magnet valve device 7.

*Straight air service brake application on an empty vehicle*

It will be understood that the strength of the springs 71 and 72 (FIG. 2A) in the load sensing portion 57 of the blending valve device 15 are such that the pressure required to be established in the chamber 44 of the air spring device 11 (FIG. 1) and in the chamber 69 (FIG. 2A) in the load sensing portion 57 in order to maintain the vehicle body 13 at the aforementioned preselected height above the railway roadbed or in other words in the position shown in FIG. 1, while the vehicle is empty, is not sufficient to compress these springs and deflect the diaphragm 66 in the direction of the left hand from the position shown in FIG. 1.

Assuming the vehicle to be empty, to effect a straight air service brake application, a release wire 256 (FIG. 1) is deenergized and an application wire 257 is substantially simultaneously energized, in any conventional or suitable manner, whereupon the release magnet valve device 7 is operated to close a communication between the straight air pipe 5 and atmosphere via the pipe 254 and a pipe 258 that is open to atmosphere, and the application magnet valve device 8 is operated to establish a communication between the pipes 253 and 254. Subsequent to operation of the application magnet valve device 8 to establish a communication therethrough between the pipes 253 and 254, fluid under pressure flows from the outlet of the feed valve device 16 to the straight air pipe 5 via the pipes 248 and 253, the application magnet valve device 8 and the pipe 254.

Fluid under pressure thus supplied to the straight air pipe 5 is effective through means (not shown) which form no part of this invention to set up dynamic brake control circuitry as a result of which the dynamic brake compensating magnet 63 is energized to a degree in proportion to the retardation force being obtained from the dynamic brake since the magnet coil 198 (FIG. 2) is connected by the wires 211 and 212 (FIG. 1) to a portion of the dynamic braking resistor 64 that is connected in the dynamic braking circuit. Energization of the magnet coil 198 is effective to cause the plunger 208 of the dynamic brake compensating magnet 63 to exert a downward thrust or force which is transmitted to the left-hand end of the balancing beam 65 via the actuating rod 214, wear pin 222, adjusting screws 223, and flanged plug 224. This force or thrust, which is proportional to the dynamic braking effect, thus transmitted to the balancing beam 65 is effective to bias this beam in a counterclockwise direction about the pin 181 (FIG. 2A) to the position shown in FIGS. 2 and 2A in which the beam abuts the adjusting screw 226 as shown in FIG. 2. In other words, this force or thrust exerted on the balancing beam 65 is in accordance with the amount of current flowing in the dynamic braking circuit it being understood that the amount of current flowing in the coil 198 of the dynamic brake compensating magnet 63 is a direct function of the pressure in the straight air pipe 5 until such time as the reducing speed of the vehicle or diminution of the current in the dynamic braking circuit makes it impossible to provide for the required flow of current through the coil 198 necessary for the plunger 208 and actuating rod 214 to maintain the balancing beam 65 against the adjusting screw 223 as shown in FIG. 2.

Fluid under pressure supplied to the straight air pipe 5 by the application magnet valve device 8 flows to the chamber 102 (FIG. 2A) below the flat-type diaphragm 91 of the variable load power unit 58 via the pipe 21 (FIG. 1), double check valve device 20, and pipe and passageway 103 (FIG. 2A). Since the vehicle is empty, the axis of the shaft 83 and the axis of the shaft 119 lie on a vertical line passing through these axes. Consequently, the fluid under pressure supplied to the chamber 102 is ineffective to move the link 85, carriage member 78 and proportioning lever 118 from the position in which they are shown in FIG. 2A. Therefore, the variable load regulating valve mechanism 59 is not operated to supply fluid under pressure to the chamber 178 above the diphragm 160 in the brake demand differential-type fluid motor 60.

Fluid under pressure supplied from the straight air pipe 5 to the pipe and passageway 103 in the manner described above also flows to the chamber 176 between the annular diaphragms 159 and 160 of the brake demand differential type fluid motor 60 via the passageway 177.

Since, at this time, the dynamic brake compensating magnet 63 is energized, as previously explained, the balancing beam 65 will be maintained in the position shown in FIGS. 1 and 2 against the differential fluid pressure force resulting from the fluid under pressure in chamber 176 acting upward on the effective area of the smaller annular diaphragm 160 and acting downward on the effective area of the larger annular diaphragm 159, and transmitted through the stem 173 to the right-hand end of the balancing beam 65 it being understood that when a brake application is first effected, and prior to a reduction in the speed of the vehicle, the degree of energization of the compensating magnet 63 produces a downward thrust or force, which is transmitted to the left-hand end of the balancing beam 65, via the plunger 208 and actuating rod 214 of the compensating magnet valve 63, that exceeds the differential fluid pressure force transmitted to the right-hand end of the balancing beam 65.

Fluid under pressure supplied from the straight air pipe 5 to the chamber 102 in the variable load power unit 58 in the manner explained above flows from the chamber 102 to the chamber 185 in the inshot portion 61 via the passageway 188 in the bottom cover member 93. Fluid under pressure thus supplied to the chamber 185 is effective to deflect the diaphragm 183 upward against the yielding resistance of the springs 190 and 196 until the annular flange formed on the upper side of the diaphragm follower 191 abuts a stop 259 formed on the casing section 50. This upward deflection of the diaphragm 183 is transmitted to the inverted truncated cone-shaped pusher element 123 of the brake cylinder regulating valve mechanism 62 via the spring 190, shims 192, spring seat 194 and stem 197 so that this pusher element is moved upward. The pusher element 123 is formed integral with the cup-shaped nut 113 which has screw-threaded engagement with the stem 112 of the combined diaphragm follower and exhaust valve seat 110 between which and the follower plate 111 the inner periphery of the flat type annular diaphragm 107 is clamped. Consequently, as the pusher element 123 is moved upward in the manner just explained, the follower plate 111 and the combined diaphragm follower and exhaust valve seat 110 are likewise moved upward to deflect the annular diaphragm 107 upward and move the annular exhaust valve seat 127 into seating contact with the exhaust valve 131. Since the chamber 134 above the annular diaphragm 107 is connected to the chamber 28 (FIG. 3) of the self-lapping relay valve device 10 via choke 157, branch 156a, passageway and pipe 156 and to the atmospheric chamber 53 via choke 157, branch 156a, passageway 156, bore 133, bore 126, counterbore 128, and port 113a, movement of the annular exhaust valve seat 127 into seating contact with the exhaust valve 131 closes communication between the chambers 28 and 134 and the atmospheric chamber 53.

Further upward movement of the pusher element 123 by the stem 197, subsequent to movement of the annular exhaust valve seat 127 into contact with the exhaust valve 131, is effective to continue the upward movement of the follower plate 111, and combined diaphragm follower and exhaust valve seat 110 to cause the annular diaphragm 107 to be further deflected in an upward direction against the yielding resistance of the spring 158 and to cause the now seated exhaust valve 131 to effect unseating of the supply valve 149 against the yielding resistance of the spring 150 from the annular supply valve seat 138 since the fluted stem of the supply valve 149 extends through the bore 137 in the supply valve seat piston member 135 and abuts the upper end of the exhaust valve 131.

Since the chamber 151 in the brake cylinder regulating valve mechanism 62 is connected to the supply reservoir 3 via passageway and pipe 152 and pipe 42, when the supply valve 149 is unseated from the annular supply valve seat 138 in the manner just explained, fluid under pressure flows from the supply reservoir 3 and the chamber 151 through the port 153, past the unseated supply valve 149 and thence to the chamber 28 (FIG. 3) in the self-lapping relay valve device 10 via the bore 137, the bore 133, and the passageway and pipe 156. The relay valve device 10 operates in response to the supply of fluid under pressure to the chamber 28 therein to effect the supply of a corresponding pressure to the brake cylinder device 1 to cause a light application of brakes on the vehicle.

Fluid under pressure flows from the passageway 156 in the brake cylinder regulating valve mechanism 62 via branch passageway 156a and choke 157 to the chamber 134 and is effective to establish a force that acts in a downward direction on the upper side of annular diaphragm 107. Upon this force slightly exceeding the force acting upward on the annular diaphragm 107 as a result of the supply of fluid under pressure from the straight air pipe 5 to the chamber 185 in the inshot portion 61 caused by the operation of the application magnet valve device 8, the combined diaphragm follower and exhaust valve seat member 110, exhaust valve 131, supply valve 149, follower plate 111, cup-shaped nut 113, inverted truncated cone-shaped pusher element 123, stem 197 and spring seat 194 will be moved downward against the yielding resistance of the spring 190 until the spring 150 seats the supply valve 149 on the annular supply valve seat 138. This cuts off flow of fluid under pressure from the supply reservoir 3 (FIG. 1) to the relay valve device 10 which, in turn, moves to a lap position to cut off flow of fluid under pressure to the brake cylinder device 1.

From the foregoing it is seen that the inshot portion 61 of the dynamic-pneumatic interlock or blending valve device 15 operates in response to the supply of fluid under pressure from the straight air pipe 5 to the chamber 185 to cause the brake cylinder regulating valve mechanism 62 to supply a chosen degree of pressure to the relay valve device 10 which in turn supplies a corresponding degree of "inshot" pressure to the brake cylinder device 1. It will be understood that this "inshot" pressure supplied to the brake cylinder device 1 is sufficient to cause the brake shoes to be moved into braking contact with the tread surface of the corresponding wheels of the vehicle and pressed against this tread surface with a light force to keep the wheels round or in other words prevent flat spots on the wheels.

As the speed of the vehicle reduces in response to the application of the dynamic brake, the current flowing through the magnet coil 198 of the dynamic brake compensating magnet 63 is correspondingly reduced. As the current flowing through the magnet coil 198 is reduced, the force transmitted by the plunger 208 to the left-hand end of the balancing beam 65 via the actuating rod 214 is correspondingly reduced.

As the force transmitted to the left-hand-end of the balancing beam 65 via the actuating rod 214 is reduced, the differential fluid pressure force, as the result of the straight air pipe pressure in the chamber 176 between the annular diaphragms 159 and 160 of the brake demand differential type fluid motor 60, transmitted to the right-hand end of the balancing beam 65 via the stem 173 is effective to rock the balancing beam 65 clockwise, as viewed in FIGS. 2 and 2A, about the pin 181.

As the balancing beam 65 is rocked clockwise about the pin 181 in the manner just described, this movement of the balancing beam 65 is transmitted to the inverted truncated cone-shaped pusher element 123 of the brake cylinder regulating valve mechanism 62 to move this pusher element 123, the cup-shaped nut 113, follower plate 111, and the combined diaphragm follower and exhaust valve seat 110 upward to effect upward deflection of the annular diaphragm 107 against the yielding resistance of the spring 158.

Since the exhaust valve 131 is seated on the annular exhaust valve seat 127, it being understood that the brake cylinder regulating valve mechanism 62 moved to lap position subsequent to its operation by the inshot portion 61 as described above, upward movement of the combined diaphragm follower and exhaust valve seat 110 effects upward movement of the now seated exhaust valve 131 and the supply valve 149, the fluted stem of which abuts the top of the exhaust valve 131, to unseat the supply valve 149 against the yielding resistance of spring 150 from the annular supply valve seat 138. When the supply valve 149 is thus unseated, fluid under pressure flows from the supply reservoir 3 (FIG. 1) and the chamber 151 (FIG. 2A) to the chamber 28 (FIG. 3) in the self-lapping relay valve device 10 via the path hereinbefore described in detail. The relay valve device 10 operates in response to the supply of fluid under pressure to the chamber 28 therein to effect the supply of a corresponding pressure to the brake cylinder device 1 to cause an increase in the degree of the brake application on the vehicle above that effected by operation of the inshot portion 61 as described above.

Fluid under pressure also flows to the chamber 134 above the diaphragm 107 in the manner hereinbefore described and when the fluid pressure force acting in a downward direction on the annular diaphragm 107 slightly exceeds the force acting in an upward direction on this diaphragm, the supply valve 149 will be seated on the annular supply valve seat 138 in the same manner as hereinbefore described in detail. This cuts off flow of fluid under pressure from the supply reservoir 3 (FIG. 1) to the relay valve device 10 which, in turn, moves to a lap position to cut off flow of fluid under pressure to the brake cylinder device 1.

From the foregoing it should be apparent that as the dynamic brake fades away and the amount of current flowing through the magnet coil 198 of the dynamic brake compensating magnet 63 decreases, the brake demand differential-type fluid motor 60, in response to the fluid under pressure supplied thereto from the straight air pipe 5, operates the brake cylinder regulating valve mechanism 62 via balancing lever 65 to increase the pressure in the chamber 28 (FIG. 3) of the self-lapping relay valve device 10 to cause this relay valve device to effect a corresponding increase in brake cylinder pressure supplied to the brake cylinder device 1 (FIG. 1). Accordingly, as the dynamic brake fades away, the pneumatic braking force is increased to compensate for the fading away of the dynamic brake so that the dynamic brake and the pneumatic brake are blended together whereby there is no reduction in the total braking effect on the vehicle as the dynamic brake fades away.

*Release of a straight air service brake application on an empty vehicle*

To effect a release of a straight air service brake application on an empty vehicle, the release wire 256 (FIG. 1) is energized and the application wire 257 is substantially simultaneously deenergized in any conventional or suitable manner whereupon the release magnet valve device 7 is operated to establish a communication between the straight air pipe 5 and atmosphere via the pipe 254 and the pipe 258, and the application magnet valve device 8 is simultaneously operated to close communication between the pipes 253 and 254 to cut off the supply of fluid under pressure from the main reservoir 2 to the straight air pipe 5. As fluid under pressure is vented from the straight air pipe 5 in the manner described above, the dynamic brake circuitry is operated in known manner to effect a release of the dynamic brake application which results in deenergization of the magnet coil 198 of the dynamic brake compensating magnet 63.

Subsequent to operation of the release magnet valve device 7 to establish the communication between the straight air pipe 5 and atmosphere, fluid under pressure will flow from the chamber 102 (FIG. 2A) in the variable load power unit 58 of the dynamic-pneumatic blending valve device 15 to atmosphere via passageway and pipe 103, double check valve device 20 (FIG. 1), pipe 21, straight air pipe 5, pipe 254, release magnet valve device 7 and pipe 258. Since the chamber 185 (FIG. 2A) in the inshot portion 61 is connected to the chamber 102 via the passageway 188, and the chamber 176 in the brake demand differential type fluid motor 60 is connected to the passageway and pipe 103 via the passageway 177, fluid under pressure will be vented respectively from the chambers 185 and 176 to atmosphere simultaneous as fluid under pressure is vented from the chamber 102.

When fluid under pressure is vented from the chamber 102 in the variable load power unit 58 to atmosphere, the various elements of this unit remain in the position shown in FIG. 2A of the drawings.

As fluid under pressure is vented from the chamber 185 in the inshot portion 61, the springs 190 and 196 are rendered effective to return the diaphragm 183, diaphragm follower 191, shims 192, spring seat 194, and stem 197 to the position shown in FIG. 2A.

As fluid under pressure is vented from the chamber 176 in the brake demand differential-type fluid motor 60, the force transmitted to the inverted truncated cone-shaped pusher element 123 of the brake cylinder regulating valve mechanism 62 via the stem 173 and the balancing lever 65 is correspondingly reduced, whereupon the spring 158 and the fluid under pressure in the chamber 134 above the annular diaphragm 107 of valve mechanism 62 are rendered effective to deflect this diaphragm downward to move the combined diaphragm follower and exhaust valve seat 110, follower plate 111, cup-shaped nut 113, and inverted truncated cone-shaped pusher element 123 downward to cause counterclockwise rocking of the balancing lever 65 about the pin 181. This downward movement of the combined diaphragm follower and exhaust valve seat 110, follower plate 111, cup-shaped nut 113 and pusher element 123 is effective to render the spring 130 effective via the plunger 129 and the fluted portion of the exhaust valve 131 to unseat this exhaust valve from the annular exhaust valve seat 127.

When the exhaust valve 131 is unseated from the annular exhaust valve seat 127 in the manner explained above, fluid under pressure flows from the chamber 28 (FIG. 3) in the self-lapping relay valve device 10 to atmosphere via passageways and pipe 156, bore 133, past unseated exhaust valve 131, bore 126, counterbore 128, port 113a, chamber 53, bores 54 (FIG. 2) in the main casing section 50, and past the flexible member 55. Fluid under pressure is also released from the chamber 134 (FIG. 2A) above the diaphragm 107 since this chamber is connected to the passageway 156 via the choke 157 and the branch passageway 156a. The self-lapping relay valve device 10 operates in response to venting of chamber 28 therein to correspondingly vent fluid under pressure from the brake cylinder device 1 to effect a release of the brakes on the vehicle.

*Straight air service brake application on a partly loaded or fully loaded vehicle*

As the body 13 of a vehicle provided with the apparatus shown in FIG. 1 and constituting the present invention is loaded, the leveling valve device 14 operates in response to the increase in load to supply fluid under pressure from the feed valve pipe 6 to the chamber 44 in the air spring device 11 via pipes 48 and 45 to establish in the chamber 44 a pressure which is sufficient to maintain the vehicle body 13 at the aforementioned preselected height relative to the truck frame 12 and the rails of the railway roadbed. Since the chamber 69 (FIG. 2A) in the load sensing portion 57 of the dynamic-pneumatic blending valve device 15 is connected to the pipe 45 via the passageway and pipe 45a, fluid under pressure will flow from the pipe 45 to the chamber 69 to increase the pressure in this chamber simultaneously as the pressure in the chamber 44 in the air spring device 11 is increased. Consequently, the pressures in the chambers 69 and 44 are always the same.

As the fluid pressure in the chamber 69 is increased by operation of the leveling valve device 14 in response to the increase in load on the vehicle body 13, the diaphragm 66 is deflected in the direction of the left hand, as viewed in FIG. 2A, against the yielding resistance of the springs 71 and 72 to effect longitudinal movement of the carriage member 78 in the direction of the left hand via diaphragm follower 73 and stem 74, it being understood that the four rollers 82 roll along the bottom flat surface of the groove 86 in the link 85 as the carriage member 78 is thus moved.

As the carriage member 78 is moved from the position shown in FIG. 2A in the direction of the left hand to a position in accordance with the degree to which the pressure in the chambers 69 and 44 is increased by operation of the leveling valve device 14 in response to the increase of the load on the vehicle body 13, the rollers 84, which are rotatably mounted on the pin 83 that is anchored in the carriage member 78, roll along the surface of the groove 121 formed in the bottom face of proportioning lever 118 which is pivotally mounted on the shaft 119 the opposite ends of which are anchored in the pair of bosses 120 formed integral with the walls of the chamber 53. Accordingly, the rollers 84 are moved from the position shown in FIG. 2A in the direction of the left hand a distance that is directly proportional to the load on the vehicle.

Now, to effect a straight air service brake application, fluid under pressure is supplied to the straight air pipe 5 in the same manner as hereinbefore explained in detail. Fluid under pressure thus supplied to the straight air pipe 5 effects an application of the dynamic brakes in the manner hereinbefore explained in consequence of which energization of the magnet coil 198 of the dynamic brake compensating magnet 63 is effected. Energization of the magnet coil 198 is effective to cause the plunger 208 of the dynamic brake compensating magnet 63 to exert a downward force or thrust which is effective to bias the balancing beam 65 against the adjusting screw 226 in the same manner as hereinbefore explained.

Fluid under pressure supplied to the straight air pipe 5 flows therefrom to the chamber 102 below the flat annular diaphragm 91 of the variable load power unit 58 via pipe 21, double check valve device 20, and pipe and passageway 103. Fluid under pressure thus supplied to the chamber 102 flows therefrom to the chamber 185 in the inshot portion 61 via the passageway 188 to cause the inshot portion 61 to operate the brake cylinder regulating valve mechanism 62 in the manner hereinbefore described in detail to effect the supply of fluid under pressure to the relay valve device 10 which in turn effects the supply of an "inshot" of fluid under pressure to the brake cylinder device 1 to cause the brake shoes to be pressed against the tread surface of the corresponding wheels with a light force as hereinbefore explained.

The fluid under pressure supplied from the straight air pipe 5 to the chamber 102 in the variable load power unit 58 of the blending valve device 15 is effective to deflect the flat annular diaphragm 91 in an upward direction, as viewed in FIG. 2A. As the flat annular diaphragm 91 is thus deflected in an upward direction, it is effective to move the diaphragm follower 96, cup-shaped nut 97 and dome-shaped plunger element 100 in an upward direction. This upward movement of the dome-shaped plunger element 100, which is disposed in the conical recess 101 having a spherical end formed in the link 85, is effective to cause the two identical cranks 88, which are pivoted on the pins 90 and pivotally connected to the link 85 by the pins 89, to be rocked counterclockwise as viewed in FIG. 2A. It will be understood that the conical recess 101 in the link 85 allows the dome-shaped pusher element 100 to slide along the side of this recess as the pusher element 100 pushes the link 85 upward as this link is simultaneously restrained to be moved in the direction of the left hand as a result of its pivotal connection with one end of each of the cranks 88, the opposite end of each crank being pivotally mounted on a corresponding pin 90.

As the link 85 is moved upward, it carries with it the carriage member 78, it being understood that the connection between the carriage member 78 and the stem 74 provided by the respective slots 79 and 80 in the carriage member and the portion 77 of reduced diameter adjacent the left hand end of the stem 74 allows the carriage member 78 to be moved upward with respect to the stem 74.

As the carriage member 78 is moved upward, the rollers 84, rotatably mounted on the opposite ends of the shaft 83 that is press-fitted into a bore in the carriage member 78, by reason of their contact with the flat surface of the groove 121 in the bottom face of the proportioning lever 118, are effective to cause the proportioning lever 118 to be rocked clockwise about the shaft 119.

It will be understood that the location to which the rollers 84 are shifted along the flat surface of the groove 121 in the bottom face of the proportioning lever 118 is farther from the center of the shaft 119 the greater the load on the vehicle, since the greater the load the higher the air spring pressure in chamber 69 and therefore the farther the carriage member 78 is moved in the direction of the left hand from the position shown in FIG. 2A. Consequently, it is apparent that the greater the load on the vehicle the greater will be the downwardly acting fluid pressure force that must be applied adjacent the left hand end of the proportioning level 118 by the fluid under pressure present in the chamber 134 of the variable load regulating valve mechanism 59 to balance the upwardly acting straight air pipe fluid pressure force applied to the proportioning level 118 intermediate its ends via the rollers 84.

Accordingly, as the proportioning level 118 is rocked clockwise about the shaft 119 by the straight air pipe fluid pressure force applied thereto via the cup-shaped nut 97, pusher element 100, link 85, rollers 82, carriage member 78 and rollers 84 carried by the carriage member 78, the left-hand end of this lever 118 is effective to move the dome-shaped pusher element 116, cup-shaped nut 113, follower plate 111, and combined diaphragm follower and exhaust valve seat 110 upward to thereby deflect the annular diaphragm 107 upward and also move the annular exhaust valve seat 127 into seating contact with the exhaust valve 131. As the proportioning lever 118 continues to be rocked clockwise, subsequent to movement of the annular exhaust valve seat 127 into seating contact with the exhaust valve 131, the supply valve 149 will be unseated from the annular supply valve seat 138 against the yielding resistance of the spring 150 since the fluted stem of the supply valve 149 extends through the bore 137 in the supply valve seat piston member 135 and abuts the upper end of the exhaust valve 131.

Since the chamber 151 in the variable load regulating valve mechanism 59 is connected to the supply reservoir 3 via passageway and pipe 152 and pipe 42, when the supply valve 149 is unseated from the annular supply valve seat 138 in the manner just explained, fluid under pressure flows from the supply reservoir 3 and the chamber 151 through the port 153, counterbore 139, past the unseated supply valve 149 and thence to the chamber 178 in the brake demand differential type fluid motor 60 via the bore 137, the bore 133 and the passageway 154. A part of the fluid under pressure supplied to the passageway 154 flows therefrom to the chamber 134 above the annular diaphragm 107 via the branch passageway 154a and the choke 155. The fluid under pressure thus supplied to the chamber 134 establishes a force that acts in a downward direction on the annular diaphragm 107 and this force is transmitted to the left-hand end of the proportioning lever 118 via follower plate 111, cup-shaped nut 113, and dome-shaped pusher element 116. It can be seen from FIG. 2A that the point of application of this downwardly acting force to the proportioning lever 118 is farther from the center of the shaft 119 than the point of application of the upwardly acting force applied to this lever at the point of contact of the rollers 84 with the surface of the groove 121 in the bottom face of the proportioning lever 118. Consequently, it is apparent that the magnitude of the downwardly acting force necessary to provide a counterclockwise moment resulting from the upwardly acting force applied to the proportioning lever 118 via the rollers 84 is less than the magnitude of this upwardly acting force and increases in magnitude as the load on the vehicle is increased since as the load on the vehicle is increased the rollers 84 are mover farther from the center of the shaft 119 in response to the increase in pressure in the chamber 69.

From the foregoing it is apparent that fluid under pressure will flow to the chamber 134 in the manner explained above until the pressure in this chamber and acting on the effective area of the annular diaphragm 107 establishes a downwardly acting force that is transmitted to the left-hand end of the proportioning lever 118 via the follower plate 111, cup-shaped nut 113 and dome-shaped pusher element 116, and is of sufficient magnitude to provide a counterclockwise moment that will effect counterclockwise rocking of the proportioning lever 118 about the shaft 119 in opposition to or against the yielding resistance of the clockwise moment applied to this lever via the rollers 84. As the annular diaphragm 107 is deflected in a downward direction in response to the supply of fluid under pressure to the chamber 134, the combined diaphragm follower and exhaust valve seat 110 is moved downward by this diaphragm, whereupon the exhaust valve 131 and supply valve 149 are moved downward by the spring 150 until the supply valve 149 is moved into seating contact with the annular supply valve seat 138 to thereby cut off further flow of fluid under pressure from the supply reservoir 3 and chamber 151 to the chamber 134 above the annular diaphragm 107 of the variable load regulating valve mechanism 59 and to the chamber 178 above the diaphragm 160 of the brake demand differential type fluid motor 60. The variable load regulating valve mechanism 59 is now in a lap position.

In the brake demand differential type fluid motor 60, the larger annular diaphragm 159 is subject on its upper side to straight air pipe pressure in chamber 176 and on its lower side to atmospheric pressure in chamber 53, and the smaller annular diaphragm 160 is subject on its upper side to the fluid under pressure supplied to the chamber 178 by the variable load regulating valve mechanism 59 in the manner explained above and on its lower side to straight air pipe pressure in the chamber 176. Consequently, the smaller annular diaphragm 160 is subject to an upwardly directed force which is equal to the product of the effective area of the smaller annular diaphragm 160 times the difference in pressure in the chamber 176 and the chamber 178, the larger annular diaphragm 159 is subject to a downwardly directed force which is equal to the product of the effective area of the larger annular diaphragm 159 times the pressure in the chamber 176, and the stem 173 is subject to a downwardly directed force or thrust that is equal to the difference in these two oppositely directed forces. Accordingly, from the foregoing it should be apparent that this downwardly directed force or thrust acting on the stem 173 varies according to the load on the vehicle and the degree of pressure in the straight air pipe 5 and chamber 176 in the brake demand differential type fluid motor 60.

As hereinbefore explained in detail, the force transmitted to the left-hand end of the balancing beam 65 via the actuating rod 214 (FIG. 2) is reduced as the current flowing through the magnetic coil 198 of the dynamic brake compensating magnet 63 is reduced in response to the fading away of the dynamic brake resulting from the corresponding reduction in speed of the vehicle. Consequently, as the force transmitted to the left-hand end of the balancing beam 65 is thus reduced, the fluid pressure force transmitted to the right-hand end of this beam via the stem 173 is effective to rock this beam 65 clockwise, as viewed in FIGS. 2 and 2A, about the pin 181 to cause the brake cylinder regulating valve mechanism 62 to operate in the manner hereinbefore-described to effect the supply of fluid under pressure from the supply reservoir 3 (FIG. 1) to the chamber 28 (FIG. 3) in the self-lapping relay valve device 10. The relay valve device 10 operates in response to the supply of fluid under pressure to the chamber 28 therein to effect the supply of a corresponding pressure to the brake cylinder device 1 (FIG. 1). Accordingly, on a partial or fully loaded vehicle, as the dynamic brake fades away, the pneumatic braking force is increased to compensate for the fading away of the dynamic brake, as is the case on an empty car, so that the dynamic brakes and the pneumatic brakes are blended together whereby there is no reduction in the total braking effect on the vehicle.

*Release of a straight air service brake application on a loaded vehicle*

The release of a straight air service brake application on a loaded vehicle is effected in the same manner as hereinbefore explained for effecting the release of a straight air brake application on an empty vehicle, and, with the exception of the operation of the variable load power unit 58 and the variable load regulating valve mechanism 59 of the dynamic-pneumatic blending valve device 15, the operation of the apparatus constituting the present invention is the same when effecting the release of a straight air service brake application on a loaded vehicle as when effecting a release of a brake application on an empty car.

It will be understood that at the time a release of a straight air service brake application on a loaded car is initiated, the variable load regulating valve mechanism 59 is in a lap position, and the chambers 176 and 178 in the brake demand differential-type fluid motor 60 are respectively charged with fluid to the pressure present in the straight air pipe 5 and to a pressure in accordance with the load on the vehicle and the pressure present in the straight air pipe 5. It will be further understood that since the variable load regulating valve mechanism 59 is in its lap position, the pressure in the chamber 134 in this valve device and the pressure in the chamber 178 in the brake demand differential-type fluid motor 60 are substantially the same. Consequently, it will be apparent that when fluid under pressure is released from the chamber 102 in the variable load power unit 58 to atmosphere via the passageway and pipe 103, double check valve device 20, pipe 21, straight air pipe 5, pipe 254, release magnet valve device 7, and pipe 258 when effecting the release of a straight air service brake application on a loaded car, the fluid under pressure present in the chamber 134 in the variable load regulating valve mechanism 59 is rendered effective to deflect the annular diaphragm 107 in a downward direction to effect, through the intermediary of the follower plate 111, cup-shaped nut 113, and dome-shaped pusher element 116, counterclockwise rocking of the proportioning lever 118 about the shaft 119. Therefore, the proportioning lever 118 is rocked counterclockwise to a position slightly below the horizontal position in which it is shown in FIG. 2A, and this counterclockwise rocking of the proportioning lever 118 is effective, via the rollers 84, to move the carriage member 78, link 85, pusher element 100, cup-shaped nut 97, and diaphragm follower plate 96 downward to a position slightly below the position shown in FIG. 2A to correspondingly deflect the annular diaphragm 91 downward.

As the fluid under pressure in the chamber 134 deflects the annular diaphragm 107 downward, as explained above, the annular exhaust valve seat 127 formed at the upper end of the bore 126 in the combined diaphragm follower and exhaust valve seat member 110 is moved downward away from the exhaust valve 131 which is biased in an upward direction by the spring 130 via the plunger 129. Upon movement of the annular exhaust valve seat 127 away from the exhaust valve 131, fluid under pressure will flow from the chamber 178 in the brake demand differential-type fluid motor 60 to the atmospheric chamber 53 via passageway 154, bore 133, past unseated exhaust valve 131, bore 126, counterbore 128, and port 113a in cup-shaped nut 113.

Since the chamber 134 is connected to the passageway 154 via the branch passageway 154a and the choke 155, fluid under pressure will be vented from the chamber 134 simultaneously as fluid under pressure is vented from the chamber 178 in the brake demand differential-type fluid motor 60 until the variable load regulating valve mechanism 59 moves to lap position.

From the foregoing it is apparent that fluid under pressure is substantially simultaneously vented from the chamber 176 and 178 in the brake demand differential-type fluid motor 60. Therefore, as fluid under pressure is vented from the chambers 176 and 178 substantially simultaneously, the downwardly acting force or thrust on the stem 173 is correspondingly reduced. At this time the brake cylinder regulating valve mechanism 62 is in a lap position and the chamber 134 therein is charged with fluid under pressure. It will be understood that the straight air pipe pressure present in the chamber 185 of the inshot portion 61 is vented to atmosphere simultaneously as fluid under pressure is vented from the chamber 102 in the variable load power unit 58 since the chamber 185 is connected to the chamber 102 via the passageway 188. Therefore, as the downwardly acting force or thrust on the stem 173 of the brake demand differential type fluid motor 60 is reduced in the manner described above, the fluid under pressure present in the chamber 134 of the brake cylinder regulating valve mechanism 62 is rendered effective to deflect the corresponding annular diaphragm 107 downward to thereby move the annular exhaust valve seat 127 formed at the upper end of the bore 126 in the combined diaphragm follower and exhaust valve seat member 110 downward away from the exhaust valve 131 which is biased in an upward direction by the spring 130 via the plunger 129 and the fluted stem of the exhaust valve 131.

When the exhaust valve 131 is unseated from the annular exhaust valve seat 127 in the manner just explained, fluid under pressure flows from the chamber 28 (FIG. 3) in the self-lapping relay valve device 10 to atmosphere via the pathway hereinbefore described in detail. Fluid under pressure is also vented from the chamber 134 (FIG. 2A) via the pathway hereinbefore described.

The self-lapping relay valve device 10 operates in response to venting of chamber 28 therein to correspondingly vent fluid under pressure from the brake cylinder device 1 to effect a release of the brakes on the vehicle.

*Pneumatic emergency brake application*

The emergency valve device 9 (FIG. 1), which is connected by the pipe 255 to the brake pipe 4, may be of any well-known construction and is operable in response to a reduction in the pressure in the brake pipe 4 at an emergency rate effected in any manner, such as, for example, rupture of the brake pipe 4, to effect the supply of fluid under pressure from the pipe 252, which is connected to the outlet of the feed valve device 16 via the pipe 250, one-way check valve device 17, pipe 249 and pipe 248, to the pipe 22 which is connected by the pipe 23 to the inlet of the one-way check valve device 19. The outlet of the check valve device 19 is connected to the chamber 28 (FIG. 3) of the self-lapping relay valve device 10 (FIG. 1) via the pipe and passageway 24, elongated peripheral annular groove 230 (FIG. 4) on the cup-shaped piston 229 of the by-pass valve device 18, passageway 231, passageway and pipe 232, and pipe 156 (FIG. 1). Consequently, whenever the pressure in the brake pipe 4 is reduced at an emergency rate, the emergency valve device 9 operates to effect the supply of fluid under pressure from the outlet of the feed valve device 16 to the chamber 28 of the self-lapping valve device 10 whereupon this valve device operates in response to the supply of fluid under pressure to the chamber 28 therein to effect the supply of a corresponding pressure to the brake cylinder device 1 to cause an application of brakes on the vehicle.

It should be noted that fluid under pressure supplied to the passageway 232 (FIG. 4), as mentioned above, in addition to flowing to the chamber 28 in the relay valve device 10, also flows to the right-hand end of the bottom bore 26, and when the pressure acting on the right-hand end of the cup-shaped piston 229 is increased sufficiently, this piston 229 is moved in the direction of the left-hand against the yielding resistance of the spring 239 to a position in which the elongated peripheral annular groove 230 on the piston 229 cuts off communication between pipe and passageway 24 and the passageway 231 thereby preventing flow of fluid under pressure to the chamber 28 in the self-lapping relay valve device 10 and a further increase in the pressure in this chamber and therefore in the brake cylinder device 1. Accordingly, it is apparent that the by-pass valve device 18 serves as a limiting valve to limit the brake cylinder pressure that is initially obtained by operation of the emergency valve device 9, it being understood that the dynamic brake is cut out in the usual manner whenever an emergency brake application is effected.

Fluid under pressure supplied by the emergency valve device 9 to the pipe 22, in addition to flowing via the by-pass valve device 18 to the relay valve device 10, also flows to the lower end of the double check valve device 20 to move the check valve (not shown) therein to a position to establish a communication between the pipe 22 and the pipe and passageway 103 if this check valve is not already in the position to establish this communication. Accordingly, fluid under pressure supplied by the emergency valve device 9 to the pipe 22 flows to the pipe and passageway 103 via the double check valve device 20. Fluid under pressure thus supplied to the pipe and passageway 103 flows to the chambers 102, 185, and 176 in the dynamic-pneumatic blending valve device 15 and causes the variable load power unit 58, the inshot portion 61 and the fluid motor 60 of this valve device to operate in the manner hereinbefore described to effect the supply of fluid under pressure to the chamber 28 (FIG. 3) of the self-lapping relay valve device 10 to increase the pressure in this chamber 28 to a value in proportion to the load on the car. Accordingly, when the pressure in the chamber 28 is increased above the pressure supplied to this chamber via the by-pass valve device 18 in response to operation of the emergency valve device 9 in the manner described above, the self-lapping relay valve device 10 operates to effect a corresponding increase in the pressure in the brake cylinder device 1 and thereby a correspondingly heavier brake application on the vehicle the degree of which is in accordance with the load on the vehicle.

*Release of a pneumatic emergency brake application*

A release of a pneumatic emergency brake application can be effected by recharging the brake pipe 4 in any conventional manner to its normal charged value. When the brake pipe 4 is recharged in any conventional manner, the emergency valve device 9 operates in response to this increase in pressure in the brake pipe 4 to close communication between the pipe 252 and the pipe 22 and establish a communication between the pipe 22 and atmosphere. When the pipe 22 is thus connected to atmosphere, fluid under pressure flows from the chambers 176, 185 and 102 in the blending valve device 15 to atmosphere via passageways 177 and 188, passageway and pipe 103, double check valve device 20, pipe 22 and emergency valve device 9. As fluid under pressure is thus released from the chambers 176, 185 and 102 in the blending valve device 15, this valve device operates in the manner hereinbefore-described in detail to cause the self-lapping relay valve device 10 to operate to release fluid under pressure from the brake cylinder device 1 to effect a release of the brakes on the vehicle.

Having now described the invention, what I claim as new and desire to secure by Letters Patent, is:

1. A brake system for a vehicle comprising:
   (a) fluid pressure operated braking means for effecting a brake application on the vehicle,
   (b) a level pivotally mounted for rocking movement in opposite directions,
   (c) fluid pressure means for exerting a first moment on said pivoted lever corresponding to the degree of a fluid pressure brake application desired, said first moment acting on said lever in the direction to cause rocking thereof in one direction,
   (d) means for exerting a second moment on said lever corresponding to the degree of dynamic braking effect exerted by a dynamic braking means on the vehicle, said second moment acting on said lever in the direction to cause rocking thereof in an opposite direction,
   (e) valve means actuated by rocking of said pivoted lever in said one direction, out of a predetermined balanced position in which said first and said second moments acting on said lever are equal, in response to a decrease in the value of said second moment resulting from reduction of the dynamic braking effect as the speed of the vehicle reduces, to effect the supply of fluid under pressure to said fluid pressure operated braking means to a degree proportional to the reduction in the dynamic braking effect exerted by the dynamic braking means whereby said fluid pressure operated braking means increases its braking effect on the vehicle to compensate for the reduction of the braking effect of the dynamic braking means.

2. A brake system for a vehicle, as claimed in claim 1, further characterized in that said lever is pivotally mounted intermediate its ends on a fulcrum member, and in that said first and second moments are exerted on said lever on the respective opposite sides of the fulcrum member.

3. A brake system for a vehicle, as claimed in claim 1, further charatcerized in that said vehicle has a sprung part and an unsprung part between which is interposed an air spring device charged with fluid at a pressure corresponding to the degree of load carried by said sprung part, and by a fluid pressure device operatively controlled according to the pressure in said air spring device for exerting a third moment on said pivoted lever which is proportional to the pressure in said air spring device and which acts in the direction to assist said first moment.

4. A brake system for a vehicle, as claimed in claim 1, further characterized by means operable, upon initiating a supply of fluid under pressure to said fluid pressure means, for operating said valve means to provide an initial supply of fluid to said fluid pressure operated braking means limited to a certain low pressure.

5. A brake system for a vehicle, as claimed in claim 3, further characterized by a fluid motor, operable by the fluid under pressure supplied to said fluid pressure means, for operating said valve means, independent of rocking of said pivoted lever out of its predetermined balanced position, to provide an initial low degree of fluid under pressure in said fluid pressure operated braking means.

6. A brake system for a vehicle, as claimed in claim 1, further charcterized by an emergency brake application means comprising:
   (a) a normally charged brake pipe,
   (b) a brake application valve device operable in response to a reduction in the pressure in said brake pipe at a rapid rate for effecting the supply of fluid under pressure to said fluid pressure operated braking means independently of said valve means, and
   (c) means for limiting to a chosen degree the pressure established in said fluid pressure operated braking means in response to the operation of said brake application valve device.

7. A brake system for a vehicle, as claimed in claim 6, further charcterized by:
   (a) a straight air pipe chargeable with fluid under pressure according to the degree of brake application desired,
   (b) means for effecting the charging of said straight air pipe with fluid under pressure to any desired degree, and
   (c) a double check valve device operable to effect the supply of the higher fluid pressure from either said straight air pipe or said brake application valve device to said fluid pressure means.

8. A brake system for a vehicle, as claimed in claim 1, further characterized by:
   (a) a straight air pipe chargeable with fluid under pressure according to the degree of brake application desired,
   (b) a normally charged brake pipe,
   (c) an emergency valve means operable in response to a reduction in the pressure in said brake pipe at a rapid rate for effecting the supply of fluid under pressure to said fluid pressure operated braking means.
   (d) valve means limiting the degree of fluid under pressure supplied by said emergency valve device to said breaking means.
   (e) a double check valve device having an outlet port and a pair of inlet ports, said inlet ports being connected respectively to said emergency valve means and said straight air pipe for alternatively supplying the higher fluid pressure to said outlet port, and
   (f) conduit means communicating fluid pressure from said outlet port to said fluid pressure means to cause the fluid pressure supplied to said fluid pressure means to rock said lever in said one direction to cause said valve means to be operated thereby to effect the supply of fluid under pressure to said fluid pressure operated braking means to increase the degree of pressure therein above that determined by said limiting valve means.

9. A brake system for a vehicle, as claimed in claim 4, further characterized by:
   (a) a straight air pipe chargeable according to the degree of brake application desired,
   (b) a normally charged brake pipe,
   (c) an emergency valve means operable in response to a reduction in the pressure in said brake pipe at an emergency rate for effecting the supply of fluid under pressure to said fluid pressure operated braking means,
   (d) valve means limiting the degree of fluid under pressure supplied by said emergency valve device to effect operation of said braking means,
   (e) a double check valve device having an outlet port and a pair of inlet ports, said inlet ports being connected respectively to said emergency valve means and said straight air pipe for alternatively supplying the higher fluid pressure to said outlet port, and
   (f) conduit means communicating fluid pressure from said outlet port to said fluid pressure means and to the said means for operating said valve means whereby the latter means effects operation of said valve means notwithstanding the second moment exerted on said pivoted lever and corresponding to the degree of dynamic braking effect of the dynamic brake-means counterbalancing the first moment exerted on said pivoted beam by said fluid pressure means in response to the fluid under pressure supplied thereto via said conduit.

10. A brake system for a vehicle, as claimed in claim 8, further characterized by electro-responsive valve means for effecting the supply of fluid under pressure to and the release of fluid under pressure from said straight air pipe to cause charging thereof with fluid at a pressure corresponding to the degree of a brake application desired.

11. For use in a combined electro-dynamic and fluid pressure brake system for a vehicle, a valve mechanism comprising:
  (a) a casing having therein a first chamber,
  (b) a lever pivotally mounted on said casing,
  (c) a fluid motor subject to the pressure established in said first chamber for exerting a first moment on said lever tending to rock it in one direction,
  (d) electro-responsive means carried by said casing energized according to the degree of dynamic braking effect and effective according to the degree of energization thereof to exert a corresponding second moment on said lever tending to rock it in an opposite direction to thereby counterbalance said first moment when said first and second moments are of equal magnitude,
  (e) self-lapping valve means operative by the rocking of said lever in said one direction out of a predetermined position in which it is positioned by said moments when of equal magnitude in response to a reduction in the magnitude of the moment exerted by said electro-responsive means to supply a control fluid pressure corresponding in degree to the unbalance of said moments, said self-lapping valve means including fluid pressure responsive means subject to the control fluid pressure established by said valve means to exert a counter moment on said lever for restoring it substantially to its predetermined balanced position.

12. For use in a combined electro-dynamic and fluid pressure brake system for a vehicle, a valve mechanism, as claimed in claim 11, further characterized in that:
  (a) said fluid motor comprises a pair of coaxially arranged movable abutments of unequal area subject differentially to fluid pressure established in a first chamber, interposed between said abutments and in that
  (b) said casing has a second chamber to which fluid under pressure may be supplied to act on the smaller of said pair of abutments in opposition to the pressure established in said first chamber thereby to increase the magnitude of said first moment exerted by said fluid motor on said lever in accordance with the degree of pressure established in said second chamber.

13. For use in a combined electro-dynamic and fluid pressure brake system for a vehicle, a valve mechanism, as claimed in claim 12, further characterized by means for supplying a controlled fluid pressure to said second chamber.

14. For use in a combined electro-dynamic and fluid pressure brake system for a vehicle, a valve mechanism, as claimed in claim 13, further characterized in that said means for supplying a controlled fluid pressure to said second chamber comprises a self-lapping valve device, and by means conditioned according to the said load on the vehicle for causing said self-lapping valve device when operated, to supply a fluid pressure varying according to the load on the vehicle.

15. For use in a combined electro-dynamic and fluid pressure brake system for a vehicle, a valve mechanism, as claimed in claim 13, further characterized in that said means for supplying a controlled fluid pressure to said second chamber comprises:
  (a) a second self-lapping valve means,
  (b) a third chamber in said casing in which a control fluid pressure may be established corresponding to that established in said first chamber,
  (c) a second fluid motor subject to the pressure established in said third chamber for operating said second self-lapping valve means to cause the supply of fluid under pressure to said second chamber, and
  (d) means interposed between said second fluid motor and said second self-lapping valve means variously conditionable to alter the degree of pressure supplied to said second self-lapping valve means upon operation thereof by said second fluid motor.

16. For use in a combined electro-dynamic and fluid pressure brake system for a vehicle, a valve mechanism, as claimed in claim 15, further characterized in that said interposed means comprises:
  (a) a second lever pivoted on said casing and rockable in one direction in response to the exertion of a moment thereon for operating said second self-lapping valve means,
  (b) means variously positionable according to an operating condition of the vehicle to alter the magnitude of said moment exerted on said second pivoted lever responsive to operation of said second fluid motor and transmitted from said second fluid motor to said second pivoted lever via said means.

17. For use in a combined electro-dynamic and fluid pressure brake system for a vehicle, a valve mechanism, as claimed in claim 16, further characterized in that said variously positionable means comprises:
  (a) track means operably connected to said second fluid motor,
  (b) a wheeled member carrying a fulcrum for said second lever, said wheeled member being borne by said track means and movable in opposite directions therealong, and,
  (c) a third fluid motor actuated according to variations in said operating condition of the vehicle for respectively positioning said wheeled member and fulcrum carried thereby with respect to said track means and said second lever according to variations in said operating condition.

18. For use in a combined electro-dynamic and fluid pressure brake system for a vehicle, a valve mechanism, as claimed in claim 17, further characterized in that said track means is movably supported on said casing, and in that said second fluid motor effects movement of said track means relative to said casing to cause rocking of said second lever.

19. For use in a combined electro-dynamic and fluid pressure brake system for a vehicle, a valve mechanism, as claimed in claim 11, further characterized by fluid pressure operated means subject to the pressure established in said first chamber for effecting operation of said self-lapping valve means, independently of rocking movement of said pivoted lever, to cause it to supply a predetermined low degree of control fluid pressure.

References Cited by the Examiner
UNITED STATES PATENTS
2,112,424  3/1938  McCune _____ 303—3

EUGENE G. BOTZ, *Primary Examiner.*